United States Patent [19]

Gohlisch

[11] 4,112,031
[45] Sep. 5, 1978

[54] PROCESS AND APPARATUS FOR PRODUCING RUBBER HOSE WITH TEXTILE THREAD REINFORCING

[75] Inventor: Hans-Joachim Gohlisch, Hannover-Waldhausen, Fed. Rep. of Germany

[73] Assignee: Paul Troester Maschinenfabrik, Fed. Rep. of Germany

[21] Appl. No.: 707,044

[22] Filed: Jul. 20, 1976

[30] Foreign Application Priority Data

Jul. 23, 1975 [DE] Fed. Rep. of Germany ....... 2532864

[51] Int. Cl.$^2$ .............................................. B29D 23/05
[52] U.S. Cl. ..................................... 264/26; 156/149; 264/89; 264/90; 264/103; 264/173; 264/236; 264/347; 425/114
[58] Field of Search .............................. 264/173–174, 264/25–26, 103, 236, 347; 425/174 R, 174.8, 113–114; 156/143, 149, 272, 274, 287; 427/45

[56] References Cited

U.S. PATENT DOCUMENTS

| | | | |
|---|---|---|---|
| 2,525,662 | 10/1950 | Freeman | 264/347 |
| 2,888,954 | 6/1959 | Gates | 156/149 |
| 3,051,992 | 9/1962 | Bradley | 264/347 |
| 3,310,447 | 3/1967 | Matthews | 156/244 |
| 3,627,610 | 12/1971 | Guelich et al. | 156/287 |
| 3,824,141 | 7/1974 | Miller et al. | 264/347 |
| 3,883,384 | 5/1975 | Hopkins | 264/236 |
| 3,988,189 | 10/1976 | Sullivan | 264/173 |

*Primary Examiner*—Jeffery R. Thurlow
*Attorney, Agent, or Firm*—Robert E. Burns; Emmanuel J. Lobato; Bruce L. Adams

[57] ABSTRACT

Rubber hose with textile thread reinforcing is produced by extruding an inner tube of rubber material, cooling the extruded tube, applying a covering of textile thread over the inner tube and then extruding an outer layer of rubber material over the textile layer. Just before the outer layer is extruded on the inner tube it is heated by subjecting it to an ultrahigh frequency field. The outer layer is extruded on under a vacuum so that the inner tube which has been softened by the UHF heating is supported by the resulting pressure differential. The resulting hose is then vulcanized. By reason of the preheating of the inner tube, the inner and outer rubber layers are at approximately the same temperature and hence vulcanized equally. The application of a vacuum during the second extrusion has the further advantage of avoiding air inclusions between the inner and outer rubber layers.

6 Claims, 2 Drawing Figures

PROCESS AND APPARATUS FOR PRODUCING RUBBER HOSE WITH TEXTILE THREAD REINFORCING

FIELD OF INVENTION

The present invention relates to a process and apparatus for the production of rubber hose and tubing with a textile thread insert or reinforcing in which an inner layer of material is extruded, this extrusion is cooled, then surrounded with textile thread whereupon a second layer is applied by extrusion as a covering and the resulting hose is thereupon vulcanized.

BACKGROUND OF INVENTION

By the old production methods, hose with thread reinforcing was built up on a core which carried and supported the successively applied material layers. With this method it was possible to produce only disconnected lengths of hose up to a length of perhaps 40 meters. The cores were in part hard and in part elastically flexible so that the hose could be wound on a drum for vulcanization. Both kinds of cores had their advantages and disadvantages. The removal of the long cores after vulcanization could be done only with difficulty and effort as well as considerable expense.

It has been known for many years to produce continuous rubber hose with textile thread inlays without use of a core. Such production even today entails considerable difficulty. By reason of these difficulties it is often not possible to use the desired materials but rather more expensive materials, the properties of which are often less favorable for the use of the hose. These materials have however the property that they facilitate the production of the hose. Likewise, it is not possible to use any desired textile thread with the particular rubber material being used. For the textile thread inlay there are the possibilities of applying a layer of textile thread to the inner rubber tube extruded by the first extruder by weaving or knitting. Other possibilities are merely to wind the thread around the inner extruded tube either crosswise with threads wound in one direction passing alternately under and over threads wound in the other direction or simply with two crosswise layers wound one over the other. The latter possibility lends itself to high speed production. However, such high speed production though possible in the application of the textile thread and in the extrusion of the hose by screw type extruders cannot in practice be attained or can be attained only with difficulties since the required vulcanization apparatus for such high rate of production must be extremely long because of the need of subjecting the hose to a certain vulcanization time.

For the vulcanization it is known to use hot baths, in particular salt baths. It is also known to effect vulcanization by the use of UHF energy. The installation used for this purpose uses hollow conductors which are fed with electromagnetic waves of a wavelength in the centimeter or decimeter range. Fluid bed vulcanization apparatus has heretofore been used in the production of hose.

The carrying out of the vulcanization of rubber hose with textile thread inserts in salt baths or in fluid bed apparatus requires an installation of great length. The use exclusively of UHF energy for vulcanization is not desirable. It is expensive and has the disadvantage that individual places on tubes of considerable wall thickness are frequently heated to too high a temperature so as to cause burning. For this reason several successive UHF vulcanization apparatuses can be used with hot air stretches between them. This also leads to a long installation and considerable expense for the vulcanization equipment.

It has been proposed to shorten the vulcanization time considerably by applying a UHF field to the hose to be vulcanized in such manner that the UHF energy is preferably absorbed by the inner material layer and then the outer temperature during the time of vulcanization can be held at a proper value for vulcanization. In this manner it is possible to produce rubber hose with textile thread inserts with a relatively short vulcanization and obtain outstanding quality. However, it is necessary that a polyester thread be used and that the inner material have a stronger polarity than the material of the outer layer.

SUMMARY OF INVENTION

It is an object of the present invention to attain the advantages of a short vulcanization time in the production of rubber hose when the inner layer is of the same material as the outer layer or of a material which has similar polarity. At the same time, the invention makes it possible to use any desired textile thread.

The invention solves this problem by subjecting the inner hose to which the textile thread has been applied to a UHF field just before the second layer of material is applied by extrusion so that the inner layer is preheated and by applying a vacuum on the outside of the inner tube while applying the outer layer so that the inner material is supported and the outer material layer is drawn onto the inner material layer.

Through the application of the UHF field before applying the outer layer of material, the inner material layer is heated just before application of the outer layer so that vulcanization begins when the outer layer is applied and begins to be vulcanized. It is desirable for the inner layer to be heated sufficiently that the temperature of the inner layer corresponds to the temperature to which the outer layer of material is to be brought. It is also desirable in some cases for the temperature of the inner layer of material to be somewhat higher than the extrusion temperature of the outer layer of material. This has the advantage of maintaining at a higher temperature that portion of the hose which in the subsequent salt bath receives less heat conducted from the outer surface of the hose by reason of the poor heat conductivity of the rubber and the thread.

As the tubular inner layer of the material is softened by the heating, it is necessary to provide mechanical support for it when applying the outer layer by extrusion. This support is provided by applying a vacuum to the outside of the tubing. As the pressure inside the tubing is atmospheric or if desired higher than atmospheric and a vacuum is applied to the outside, support is provided by the pressure differential. Simultaneously with this vacuum, the material of the outer layer is extruded onto the outer face of the inner layer so that no air inclusions between the inner and outer layers of material remain. A hose of particularly high quality is thereby produced.

As moisture is generally present in textile thread, the thread is dried before use so that it is completely moisture free. Through the particular arrangement of the UHF heating apparatus before the second extruder, it is attained that —as water is a polar medium—all moisture will be evaporated from the thread in the UHF zone so that the thread after leaving the UHF zone is fully water free and moisture free. In this condition the tubular inner layer with the thread thereon enters the extrusion head of the second extruder.

The nature and advantages of the invention will be more fully understood from the following description in conjunction with the accompanying drawings which show schematically by way of example apparatus for carrying out the process in accordance with the present invention. In the drawings:

FIG. 1 is a side view of the apparatus; and
FIG. 2 is a plan.

By reason of the length of the installation, the side view and the plan are divided into two parts, the lower part in each instance being a continuation of the upper part. The direction in which the hose moves as it is fabricated is from right to left.

DESCRIPTION OF PREFERRED EMBODIMENT

Figure 1:
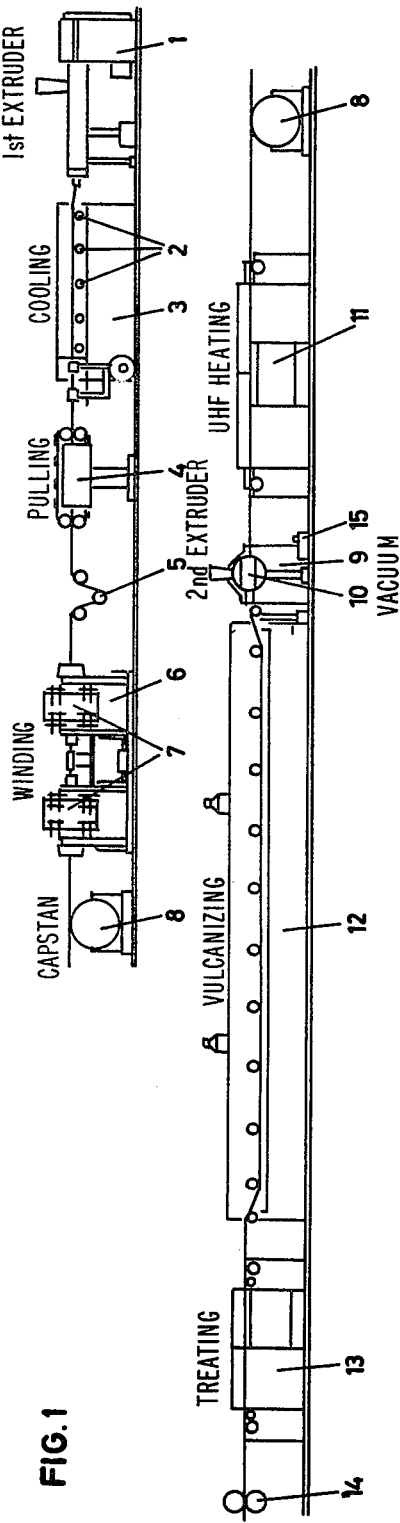
Figure 2:
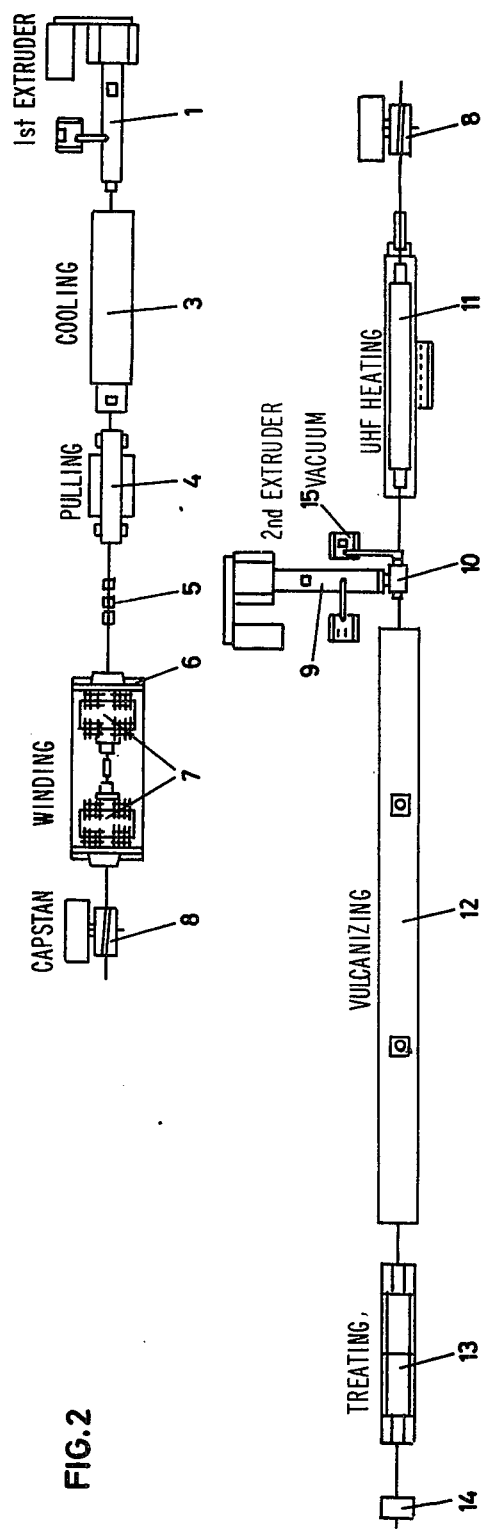

In carrying out the process of the present invention with the apparatus illustrated in the drawings, the tubular inner layer of the rubber hose to be produced is extruded with a continuous screw-type extruder 1. The extruder tubing is led over rollers 2 through cooling apparatus 3 in which the temperature of the inner layer is sufficiently reduced that the tubular inner layer retains its geometric form. The drawing off of the tubular inner layer is effected by caterpillar type pulling apparatus 4 followed by a compensating roller control device 5 for equalizing any speed variation in the extruding process. Following the compensating roller control device 5 the tubular inner layer passes through a tandem cord winding machine 6, the two winding heads 7 of which wind two layers of textile thread in opposite directions on the tubular inner layer of the hose. The semi-fabricated hose is drawn out of the winding machine by means of a motor driven capstan 8. The semi-fabricated hose is then heated by passing through UHF apparatus 11 and then is led through the extrusion head 10 of a second screw-type extruder 9 which applies a covering layer of rubber material over the textile thread winding. Upon leaving the second extruder the hose enters a vulcanizer 12 which is shown as comprising a salt bath.

The extrusion head 10 of the second extruder 9 is connected with vacuum apparatus 15. This vacuum apparatus produces a vacuum which in the extrusion head 10 acts on the outside of the tubular inner layer of the hose with the thread wound thereon. In this manner the inner layer of material which has been heated by the UHF apparatus 11 and is hence relatively soft is supported by the pressure inside the tubular inner layer which can be atmospheric or can be super-atmospheric. Through this pressure in the inside of the hose the inner layer of material is supported in such manner that before entry into the actual extrusion nozzle it assumes a round form. Simultaneously in the extrusion head 10 the second layer of material is drawn by vacuum onto the outer surface of the inner material layer with the thread wound thereon so that the outer layer is applied on the inner layer of material without any air inclusion between the layers.

Upon leaving the extrusion head 10 of the second extruder 9, both layers of material have the same or approximately the same temperature. The inner layer is as warm as or warmer than the outer layer. Hence, upon entry of the salt bath 12 both layers of material quickly reach the optimum vulcanization temperature. Thus, equal and uniform vulcanization of both layers is assured.

Following the salt bath 12, the vulcanized hose passes through further treating apparatus 13 and between a pair of drafting rollers 14.

It will be understood that modifications may be made in the process and apparatus and hence the invention is in no way limited to the specific example herein described and illustrated in the drawings.

What I claim is:

1. A process of making continuous reinforced rubber hose which comprises the steps of:
   extruding a tubular inner layer of rubber material at elevated temperature,
   cooling the extruded tubular inner layer,
   applying textile thread reinforcing around the cooled tubular inner layer,
   subjecting the tubular inner layer with the textile thread thereon to a UHF field to preheat said inner layer to a selected elevated temperature below vulcanizing temperature,
   while said tubular inner layer with said thread thereon is still hot, extruding an outer layer of rubber material thereon at elevated temperature while applying a vacuum to the exterior thereof in the zone of extrusion,
   whereby said tubular inner layer with said thread thereon is internally supported by air pressure inside the tubular inner layer and said outer layer is applied under said vacuum,
   the temperature to which said tubular inner layer with said textile thread thereon is preheated being at least approximately as high as the temperature at which said outer layer is extruded, and
   whereupon vulcanizing the hose comprising said tubular inner layer, textile thread and outer layer, said vulcanization being initiated while said tubular inner layer is still at an elevated temperature by virtue of said preheating.

2. A process according to claim 1, in which the temperature to which said tubular inner layer with said thread thereon is preheated is approximately equal to the extrusion temperature of said outer layer.

3. A process according to claim 1, in which said vulcanization is effected by passing said hose through a fluid bath maintained at vulcanizing temperature.

4. Apparatus for making continuous reinforced rubber hose comprising:
   first extrusion means for extruding a tubular inner layer of rubber material at elevated temperature,
   means for cooling the extruded inner layer,
   means for applying textile thread around the cooled tubular inner layer,
   means for subjecting the tubular inner layer with the textile thread thereon to a UHF field to preheat said inner layer to a selected elevated temperature below vulcanizing temperature,
   second extrusion means for extruding a tubular outer layer of rubber material at elevated temperature onto said tubular inner layer with the thread thereon while still hot from said preheating,
   means connected with said second extrusion means for applying a vacuum to the outside of said tubular inner layer while said outer layer is being extruded thereon,
   whereby said tubular inner layer with said thread thereon is internally supported by air pressure inside said tubular inner layer during extrusion of said outer layer thereon, the temperature to which said tubular inner layer with said textile thread thereon is preheated by said preheating means being at least approximately as high as the temperature at which said outer layer is extruded thereon, and means for thereupon vulcanizing the hose comprising said tubular inner layer, textile thread and outer layer, said vulcanizing means being adjacent said second extrusion means so as to initiate vulcanization while said tubular inner layer is still at an elevated temperature by virtue of said preheating.

5. Apparatus according to claim 4, in which said vulcanizing means comprises a hot fluid bath through which said hose is passed.

6. A process according to claim 1, in which the temperature to which said tubular inner layer with said thread thereon is preheated higher than the extrusion temperature of said outer layer.

* * * * *